US012584890B2

(12) United States Patent
Richarz et al.

(10) Patent No.: US 12,584,890 B2
(45) Date of Patent: Mar. 24, 2026

(54) DEVICES, SYSTEMS AND METHODS OF INFORMATIONAL SIGNAL SYNCHRONIZATION USING A REFERENCE SIGNAL

(71) Applicant: KENWAVE SOLUTIONS INC., Mississauga (CA)

(72) Inventors: Werner G. Richarz, Mississauga (CA); Harrison F. Richarz, Markham (CA); Tuukka Vaelimaa, Espoo (FI)

(73) Assignee: KENWAVE SOLUTIONS INC., Mississauga (CA)

( * ) Notice: Subject to any disclaimer, the term of this patent is extended or adjusted under 35 U.S.C. 154(b) by 255 days.

(21) Appl. No.: 18/273,437

(22) PCT Filed: Jan. 20, 2022

(86) PCT No.: PCT/IB2022/050490
§ 371 (c)(1),
(2) Date: Jul. 20, 2023

(87) PCT Pub. No.: WO2022/157669
PCT Pub. Date: Jul. 28, 2022

(65) Prior Publication Data
US 2024/0102971 A1 Mar. 28, 2024

Related U.S. Application Data

(60) Provisional application No. 63/140,082, filed on Jan. 21, 2021.

(51) Int. Cl.
*G01N 29/44* (2006.01)
*G01N 29/07* (2006.01)
(52) U.S. Cl.
CPC ......... *G01N 29/4463* (2013.01); *G01N 29/07* (2013.01); *G01N 2291/103* (2013.01)

(58) Field of Classification Search
None
See application file for complete search history.

(56) References Cited

U.S. PATENT DOCUMENTS 9,002,672 B2 4/2015 Riendeau et al.
9,234,960 B1 * 1/2016 McIntosh ................ E01F 9/529
(Continued)

FOREIGN PATENT DOCUMENTS

CA 2397174 7/2001
JP H06082242 3/1994
(Continued)

OTHER PUBLICATIONS

Abdullahi, Mustapha, "Detection of Leakage and Blockage in Pipeline Systems". The University of Manchester (United Kingdom), 2019.

(Continued)

*Primary Examiner* — Suman K Nath
(74) *Attorney, Agent, or Firm* — Perry + Currier Inc.

(57) ABSTRACT

An example method includes: recording, at a first sensor device, (i) a first informational signal as detected at the first sensor device; and (ii) a reference signal as detected at the first sensor device; recording, at a second sensor device (i) a second informational signal as detected at the second sensor device; and (ii) the reference signal as detected at the second sensor device; determining a time shift between the reference signal as recorded by the first sensor device and the reference signal as recorded by the second sensor device; and applying the determined time shift to the second informational signal to time-align the first informational signal and the second informational signal.

18 Claims, 6 Drawing Sheets

(56) References Cited

U.S. PATENT DOCUMENTS

| | | |
|---|---|---|
| 2018/0095010 A1 | 4/2018 | Wewers |
| 2018/0292356 A1 | 10/2018 | Findikoglu et al. |
| 2019/0128766 A1 | 5/2019 | Burtea et al. |

FOREIGN PATENT DOCUMENTS

| | | |
|---|---|---|
| JP | H10090106 | 4/1998 |
| JP | 2019513217 A | 5/2019 |
| WO | WO-2016208167 A1 | 12/2016 |
| WO | WO-2020236494 A1 | 11/2020 |

OTHER PUBLICATIONS

Rhudy, Matthew. "Time Alignment Techniques for Experimental Sensor Data." International Journal of Computer Science and Engineering Survey 5.2 (2014): 1.

Semmlow, J. "Basic concepts in signal processing." Signals and Systems for Bioengineers (2012): 35-80.

* cited by examiner

300

305
Record first data signal and reference signal at first sensor device

310
Record second data signal and reference signal at second sensor device

315
Determine time shift between reference signal recordings

320
Apply time shift to data signals

325
Output time-aligned data signals

400

DEVICES, SYSTEMS AND METHODS OF INFORMATIONAL SIGNAL SYNCHRONIZATION USING A REFERENCE SIGNAL

FIELD

The specification relates generally to informational signal synchronization, and more particularly to devices, systems and methods of informational signal synchronization using a reference signal.

BACKGROUND

Many applications, such as condition assessment of pipes, may utilize the correlation of a signal received at two locations to estimate, for example, the position of a leak. The evolution of a known test signals between two measurement locations is of interest. Such systems require time-alignment or synchronization of the signals to be compared. Central processing may facilitate timing using a common clock or synchronization by means of a timing signal received from a satellite or atomic clock radio network, however this requires care to ensure that all signals and recordings are synchronized before and during the operation.

SUMMARY

According to an aspect of the present specification, a method for signal synchronization is described. The method includes: recording, at a first sensor device, (i) a first informational signal as detected at the first sensor device; and (ii) a reference signal as detected at the first sensor device; recording, at a second sensor device (i) a second informational signal as detected at the second sensor device; and (ii) the reference signal as detected at the second sensor device; determining a time shift between the reference signal as recorded by the first sensor device and the reference signal as recorded by the second sensor device; and applying the determined time shift to the second informational signal to time-align the first informational signal and the second informational signal.

According to another aspect of the present specification, a computing device for signal synchronization is described. The computing device includes: a memory; a communications interface configured to communicate with a first sensor device and a second sensor device; a processor interconnected with the memory and the communications interface, the processor configured to: obtain, from the first sensor device, a first sensor recording, the first sensor recording including (i) a first data track representing a first informational signal as detected by the first sensor device and (ii) a first reference track representing a reference signal as detected by the first sensor device; obtain, from the second sensor device, a second sensor recording, the second sensor recording including (i) a second data track representing a second informational signal as detected by the second sensor device and (ii) a second reference track representing the reference signal as detected by the second sensor device; determine a time shift between the reference signal as recorded by the first sensor and the reference signal as recorded by the second sensor; and apply the determined time shift to the second informational signal to time-align the first informational signal and the second informational signal.

According to another aspect of the present specification, a sensor device for obtaining a sensor recording is described.

The sensor device includes: an informational signal sensor configured to detect an informational signal; a reference signal sensor configured to detect a reference signal; a memory; and a processor interconnected with the informational signal sensor, the reference signal sensor and the memory, the processor configured to: generate informational data representing the informational signal and record the informational data in an informational track of a sensor recording; generate reference data representing the reference signal and record the reference data in a reference track of the sensor recording, wherein the informational track and the reference track are time-aligned relative to one another; and store the sensor recording locally in the memory.

BRIEF DESCRIPTION OF DRAWINGS

Implementations are described with reference to the following figures, in which.

DETAILED DESCRIPTION

Current methods of synchronization rely on the synchronization of all devices before and during recording operations, based on a common clock, or a timing signal received from a satellite or atomic clock radio network. Additionally, the measured signals are transmitted via a frequency modulated (FM) link to a base station to be processed with digital data acquisition and signal analysis. The operational limit of the instrument is therefore determined, in part, by the nominal range of the radio link. The radio links may also suffer from interference (which degrades signal quality) and have small dynamic range (implying that low level signals may not be detected).

For transducer separations greater than the range of the radio link, or where electromagnetic interference precludes the use of low-powered short-range radios, a different approach is utilized. It may be possible to use special signal cables to link sensors with a central data acquisition node. This involves the design, fabrication and testing of special signal buffer and line driver circuits that are needed to assure the noise and interference free signal transmission. Furthermore, it may not be possible to install the cables from a logistical point of view, or else installation would contribute a substantial material cost.

According to the present specification, a system for signal synchronization using a reference signal is described. The system utilizes sensor devices which may record both the informational signal (i.e., the signal of interest) as well as a reference signal, such as a broadcast of a frequency modulated (FM) radio station. Each sensor device may commence recording at approximately the same time but may differ by up to about a second based on the speed of transmission of an initiation signal (e.g., via cellular networks or other networks or manual application of inputs by multiple operators). That is, each sensor device may generate an independent sensor recording. After acquiring the requisite informational signal recordings, the sensor recordings may be provided to a centralized control device and synchronized using the reference signal after the recording operation is complete. Advantageously, varying types of reference signals may be used, including optical signals, if line-of-sight is available between the sensor devices, satellite radio, even random signals. Further, the number of simultaneous measurement points is not limited by radio transmitter capacity, and hence a measurement system employing multiple (e.g., 4, 6, 12, or more) sensor devices is possible for greater accuracy.

Figure 1:
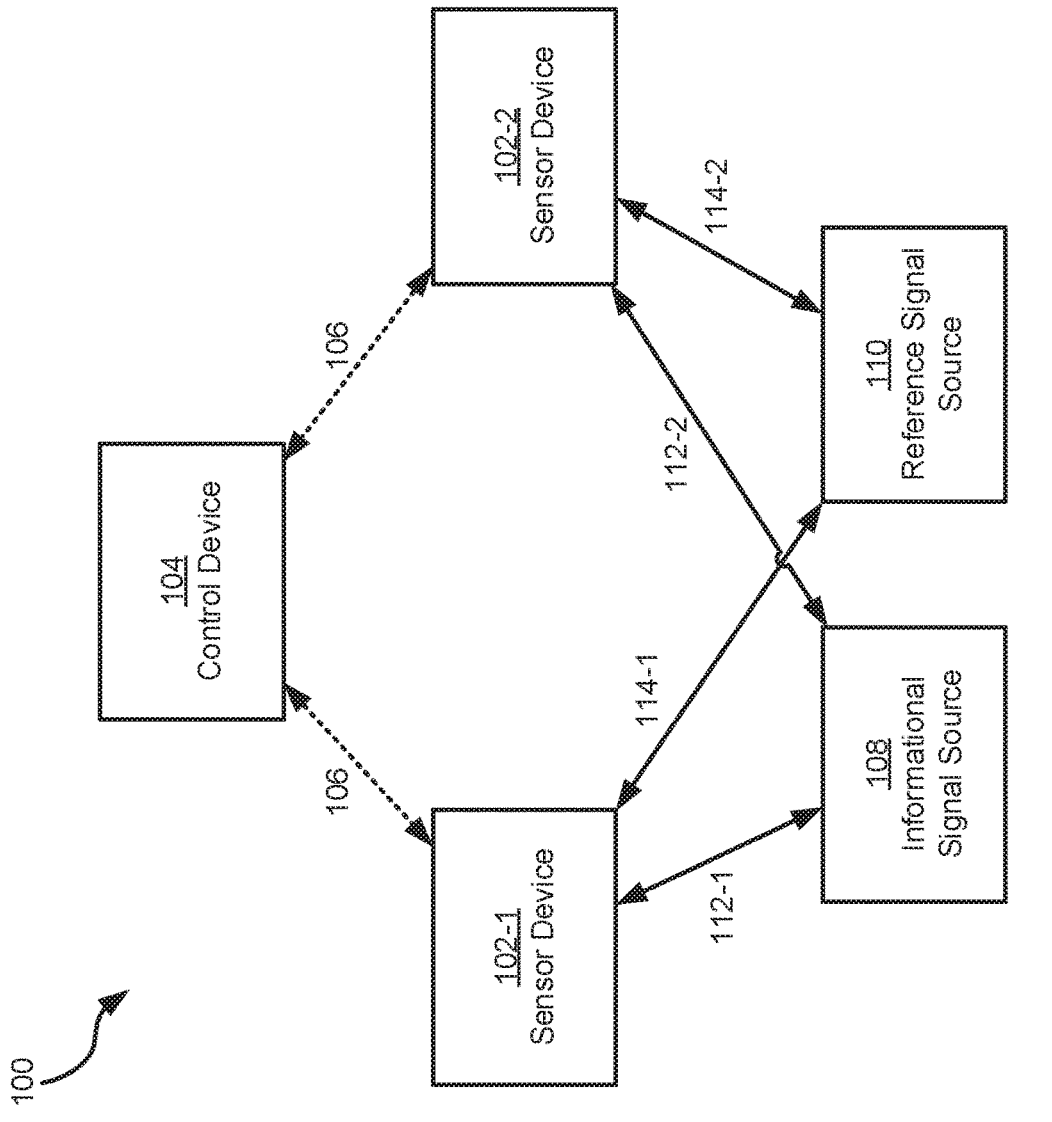
FIG. 1 depicts an example system for signal synchronization using a reference signal.

FIG. 1 depicts an example system 100 for signal synchronization using a reference signal. The system 100 includes a plurality of sensor devices 102, of which two sensor devices 102-1 and 102-2 are depicted (the sensor devices 102-1 and 102-2 are referred to herein generically as a sensor device 102 and collectively as sensor devices 102) and a control device 104 in communication with the sensor devices 102 via communication links 106.

The sensor devices 102 are generally configured to detect signals, such as optical signals, radio signals, acoustic signals, vibratory signals, displacement signals, temperature signals, pressure signals, voltages, current or the like. In particular, each sensor device 102 may include one or more sensors, such as radio receivers or transceivers, microphones, optical detectors, accelerometers, temperature sensors, displacement sensors, pressure sensors, or other suitable sensors to detect said signals. More specifically, each sensor device 102 is configured to detect an informational signal from an informational signal source 108, the informational signal received via an informational signal channel 112. Each sensor device 102 is further configured to detect a reference signal from a reference signal source 110, the reference signal received via a reference signal channel 114. That is, the sensor device 102 is configured to receive at least two signals (i.e., an informational signal and a reference signal) over different channels simultaneously.

For example, the first sensor device 102-1 is configured to detect a first informational signal from the informational signal source 108 via a first informational channel 112-1 and a reference signal from the reference signal source 110 via a first reference channel 114-1. Similarly, the second sensor device 102-2 is configured to detect a second informational signal from the informational signal source 108 via the second informational channel 112-2 and the reference signal from the reference signal source 110 via the second reference channel 114-2.

The internal components of the sensor devices 102 enabling such functionality will be described in greater detail below. In the present example, the system 100 includes two sensor devices 102; in other examples, the system 100 may include more than two sensor devices 102.

The control device 104 may be a computing device such as a server, desktop computer, laptop computer, mobile device, such as a cell phone, a smart phone, a tablet, or the like. The control device 104 is in communication with the sensor devices 102 via communication links 106, such as wired or wireless links, or a combination of wired and wireless including direct links, or links that traverse one or more networks. For example, the communication links may utilize networks including any one of, or any combination of, a local area network (LAN) defined by one or more routers, switches, wireless access points or the like, any suitable wide area networks (WAN) including cellular networks and the internet, and the like.

The control device 104 is generally configured to initiate and terminate recording operations at the sensor devices 102, and may further be configured to aggregate data from the sensor devices 102 and perform analysis on the signals recorded by the sensor devices 102 to time-align the informational signals. In some examples, the functionality described herein with respect to the control device 104 may be implemented by one or more separate computing devices. For example, the control device 104 may be configured to control the recording operations at the sensor devices 102, while a different computing device (not shown) may be configured to aggregate the data captured at the sensor devices 102 and analyze the data to time-align the informational signals.

The informational signal source 108 is a source which emits informational signals for analysis. In particular, the informational signals are received and recorded at multiple locations (i.e., by the sensor devices 102) and may require time-alignment for relevant analysis. For example, the informational signal source 108 may be an acoustic source emitting an acoustic signal to be recorded at least two locations by the sensor devices 102 to determine properties of the medium through which the acoustic signal travelled. For example, an acoustic signal may be emitted into a pressure vessel to determine properties, such as wall thickness, faults, or other properties of the pressure vessel. The informational signal is not particularly limited to acoustic signals. In some examples, the informational signal source 108 may emit an electrical signal, a vibratory signal, a pressure signal, or the like, which is recorded by the sensor devices 102.

In some examples, the informational signal source 108 may emit an informational signal which may change over time and distance from the informational signal source 108 to each of the sensor devices 102. Accordingly, the first informational signal may represent the informational signal as detected at the first sensor device 102-1. Similarly, the second informational signal may represent the informational signal as detected at the second sensor device 102-2. That is, given a single originating informational signal, the first sensor device 102-1 may capture first informational data representing the originating informational signal as detected at the first sensor device 102-1 and the second sensor device 102-2 may capture second informational data representing the originating informational signal as detected at the second sensor device 102-2.

In other examples, the informational signal source 108 may emit multiple informational signals simultaneously via multiple informational channels, and hence the first informational signal and the second informational signal may be different signals sent via different informational channels (i.e., via the first informational channel 112-1 and the second informational channel 112-2 respectively). In still further examples, the informational signal source 108 may be implemented as multiple distinct signal sources. More generally, the informational signal source 108 represents the source of multiple signals (i.e., as received by the sensor devices 102) which are to be time-aligned and analyzed and/or compared to extract some information.

The reference signal source 110 is a source which emits at least one reference signal to assist with the signal synchronization operation of the system 100. In particular, the reference signal is a signal which may be broadcast over a wide range and is received substantially simultaneously and with substantially the same integrity and fidelity at each sensor device 102. That is, the reference signal source 110 emits a reference signal which is consistently received irrespective of distance between the reference signal source 110 and each sensor device 102. For example, the reference signal source 110 may be a frequency modulated (FM) radio station emitting FM radio waves as the reference signal. In other examples, where line of sight is available between the sensor devices 102, the reference signal source 110 may be a light source emitting an optical signal, such as a sequence of light pulses.

In particular, the reference signal source 110 provides a single reference signal which is consistently received, and hence the reference signal as detected by the first sensor device 102-1 and the reference signal as detected by the second sensor device 102-2 correspond to said single reference signal. That is, the first sensor device 102-1 may capture first reference data representing the reference signal, and the second sensor device 102-2 may capture second reference data representing the same reference signal.

As will be appreciated, the reference signal source 110 may be a component which is external to the system 100, but which provides a reference signal which may be utilized and recorded by the components of the system 100. In some examples, components of the system 100 may use and record reference signals from two or more reference signal sources 110.

Figure 2:
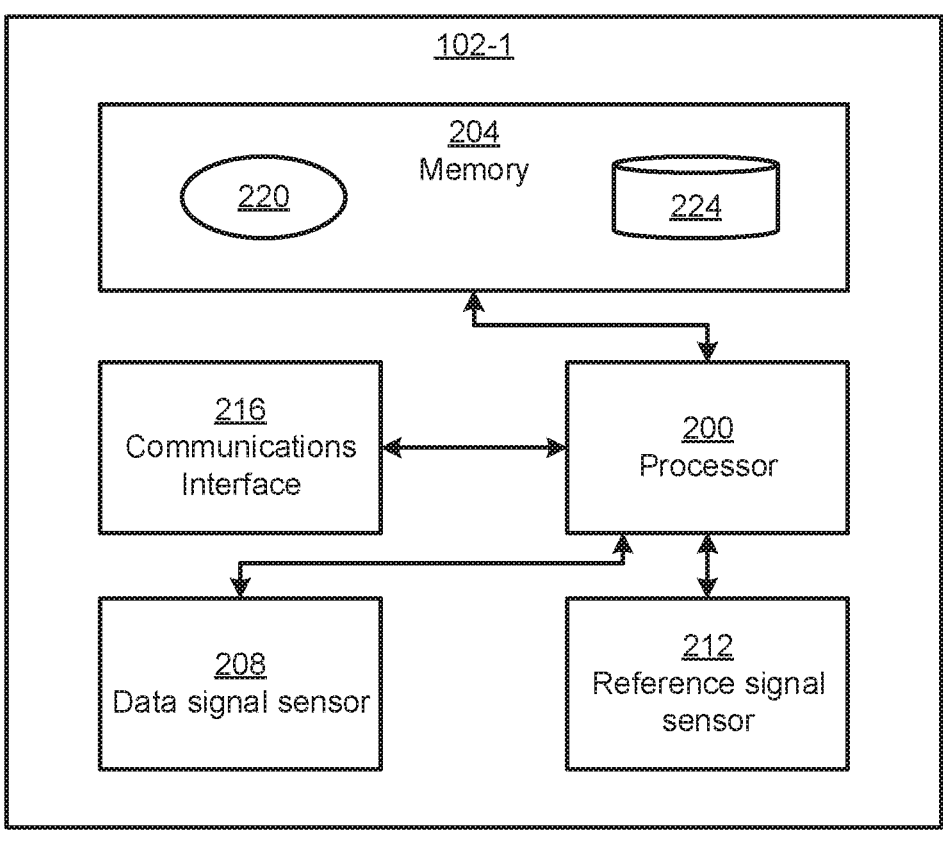
FIG. 2 depicts certain internal components of a sensor device and a control device in the system of FIG. 1.
Figure 2:
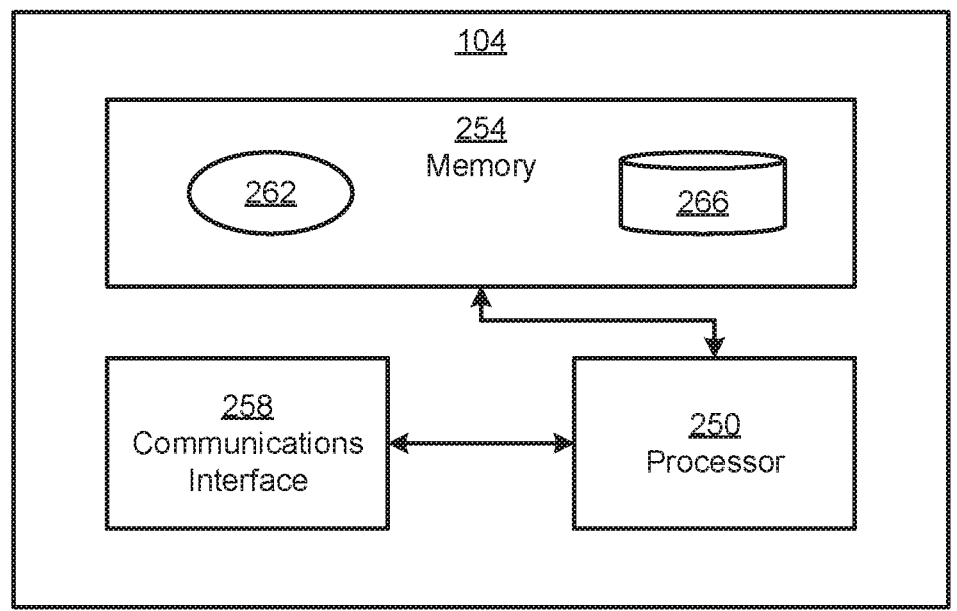

Turning to FIG. 2, the first sensor device 102-1, including certain internal components, and the control device 104, including certain internal components, are shown in greater detail.

The sensor device 102-1 includes a processor 200, a memory 204, an informational signal sensor 208, a reference signal sensor 212, and a communications interface 216. It will be understood that the second sensor device 102-2 and any further sensor devices 102 may include similar components.

The processor 200 may be a central processing unit (CPU), a microcontroller, a processing core, or similar. The processor 200 may include multiple cooperating processors. In some examples, the functionality implemented by the processor 200 may be implemented by one or more specially designed hardware and firmware components, such as a field-programmable gate array (FPGA), an application-specific integrated circuit (ASIC) and the like. In some examples, the processor 200 may be a special purpose processor which may be implemented via dedicated logic circuitry of an ASIC, an FPGA, or the like in order to enhance the processing speed of the signal recording operation discussed herein.

The processor 200 is interconnected with a non-transitory computer-readable storage medium, such as the memory 204. The memory 204 may include a combination of volatile memory (e.g., random access memory or RAM) and non-volatile memory (e.g., read only memory or ROM, electrically erasable programmable read only memory or EEPROM, flash memory). The processor 200 and the memory 204 may comprise one or more integrated circuits. Some or all of the memory 204 may be integrated with the processor 200. The memory 204 stores computer-readable instructions for execution by the processor 200. In particular, the memory 204 stores a control application 220 which, when executed by the processor 200, configures the processor 200 to perform various functions discussed below in greater detail and related to a signal recording operation of the sensor device 102-1 for a signal synchronization operation of the system 100. In other examples, the application

220 may also be implemented as a suite of distinct applications. The memory 204 may also store a repository 224 configured to store sensor recordings from recording operations of the sensor device 102-1. In other examples, the memory 204 and/or the repository 224 may also store other rules and data pertaining to the signal recording operation of the sensor device 102-1 and the signal synchronization operation of the system 100.

The sensor device 102-1 also includes the informational signal sensor 208 configured to detect an informational signal emitted from the informational signal source 108. For example, the informational signal sensor 208 may be a radio transceiver, a photodetector, an accelerometer, a temperature sensor, a pressure sensor, a displacement sensor, combinations of the above, and the like. In some examples, the informational signal sensor 208 may include a suite of sensors configured to detect multiple informational signals or multiple types of informational signals. In particular, the specific components of the informational signal sensor 208 are selected based on the type of informational signal the sensor device 102-1 is to detect.

The sensor device 102-1 further includes the reference signal sensor 212 configured to detect the reference signal emitted from the reference signal source 110. For example, the reference signal sensor 212 may be a radio receiver/antenna, a photodetector, combinations of the above, and/or other suitable sensors capable of detecting the reference signal. In particular, the specific components of the reference signal sensor 212 are selected based on the type of reference signal the sensor device 102-1 is to detect.

The reference signal (e.g. the FM frequency) may be pre-selected or it may be selected by the according to the signal strength measured by the reference signal sensors 208, 212 at the first and second locations. Before receiving the initiation signal at the control device 104, one or both of the reference signal sensors 208, 212 may measure the signal strength of at least one reference signal. The reference signal sensors 208, 212 may select the reference signal with the highest signal strength at the respective location, or the selection may be made by the control device 104. In implementations where the reference signal sensors 208, 212 select the reference signal, the selection may be overridden by the control device 104 if the first and second reference sensors do not select the same reference signal. In some implementations, if the signal strength of a first reference signal is below a pre-determined threshold at either location, control device 104 may control the reference signal sensors 208, 212 to measure the signal strength of a second reference signal until the sensors 208, 212 detect a reference signal that meets the pre-determined threshold at both locations. In other implementations, the reference signal sensors 208, 212 may measure the signal strength of two or more reference signals, and the control device 104 may select the reference signal with the highest combined signal at both locations. For example, the control device 104 may select the reference signal with the highest signal strength at the first location and the third highest signal strength at the second location. The control device 104 may be programmed to select a reference signal, or the control device 104 may select a reference signal based on an input by the operator at the control device 104. In some examples, the operator may override any selection made by the control device 104.

The sensor device 102-1 also includes the communications interface 216 interconnected with the processor 200. The communications interface 216 includes suitable hardware (e.g., transmitters, receivers, network interface controllers and the like) allowing the sensor device 102-1 to communicate with other computing devices, in particular, with the control device 104. The specific components of the communications interface 216 are selected based on the type of network or other links, including the communication links 106 that the sensor device 102-1 is to communicate over.

In some examples, the sensor device 102-1 may also include one or more input and/or output devices (not shown), interconnected with the processor 200. The input devices can include one or more buttons, keypads, dials, touch-sensitive display screens or the like for receiving input from an operator, for example, to configure the FM radio settings when the reference signal to be used is an FM radio station. The output devices can include one or more display screens, sound generators, vibrators or the like for providing output or feedback to an operator.

The control device 104 includes a processor 250, a memory 254, and a communications interface 258.

The processor 250 may be a CPU, a microcontroller, a processing core, or similar. The processor 250 may include multiple cooperating processors. In some examples, the functionality implemented by the processor 250 may be implemented by one or more specially designed hardware and firmware components, such as an FPGA, an ASIC and the like. In some examples, the processor 250 may be a special purpose processor which may be implemented via dedicated logic circuitry of an ASIC, an FPGA, or the like in order to enhance the processing speed of the signal synchronization operation discussed herein.

The processor 250 is interconnected with a non-transitory computer-readable storage medium, such as the memory 254. The memory 254 may include a combination of volatile memory (e.g., random access memory or RAM) and non-volatile memory (e.g., read only memory or ROM, electrically erasable programmable read only memory or EEPROM, flash memory). The processor 250 and the memory 254 may comprise one or more integrated circuits. Some or all of the memory 254 may be integrated with the processor 250. The memory 254 stores computer-readable instructions for execution by the processor 250. In particular, the memory 254 stores a control application 262 which, when executed by the processor 250, configures the processor 250 to perform various functions discussed below in greater detail and related to a signal synchronization operation of the system 100. In other examples, the application 262 may also be implemented as a suite of distinct applications. The memory 204 may also store a repository 266 configured to store time-aligned informational signals. In other examples, the memory 204 and/or the repository 266 may also store other rules and data pertaining to the signal synchronization operation of the system 100.

The control device 104 also includes the communications interface 258 interconnected with the processor 250. The communications interface 258 includes suitable hardware (e.g., transmitters, receivers, network interface controllers and the like) allowing the control device 104 to communicate with other computing devices, in particular, with the sensor devices 102. The specific components of the communications interface 258 are selected based on the type of network or other links, including the communication links 106 that the control device 104 is to communicate over.

In some examples, the control device 104 may also include one or more input and/or output devices (not shown), interconnected with the processor 250. The input devices can include one or more buttons, keypads, dials, touch-sensitive display screens or the like for receiving input from an operator, for example, to initiate a recording operation at the sensor devices 102. The output devices can include one or more display screens, sound generators, vibrators or the like for providing output or feedback to an operator.

Figure 3:
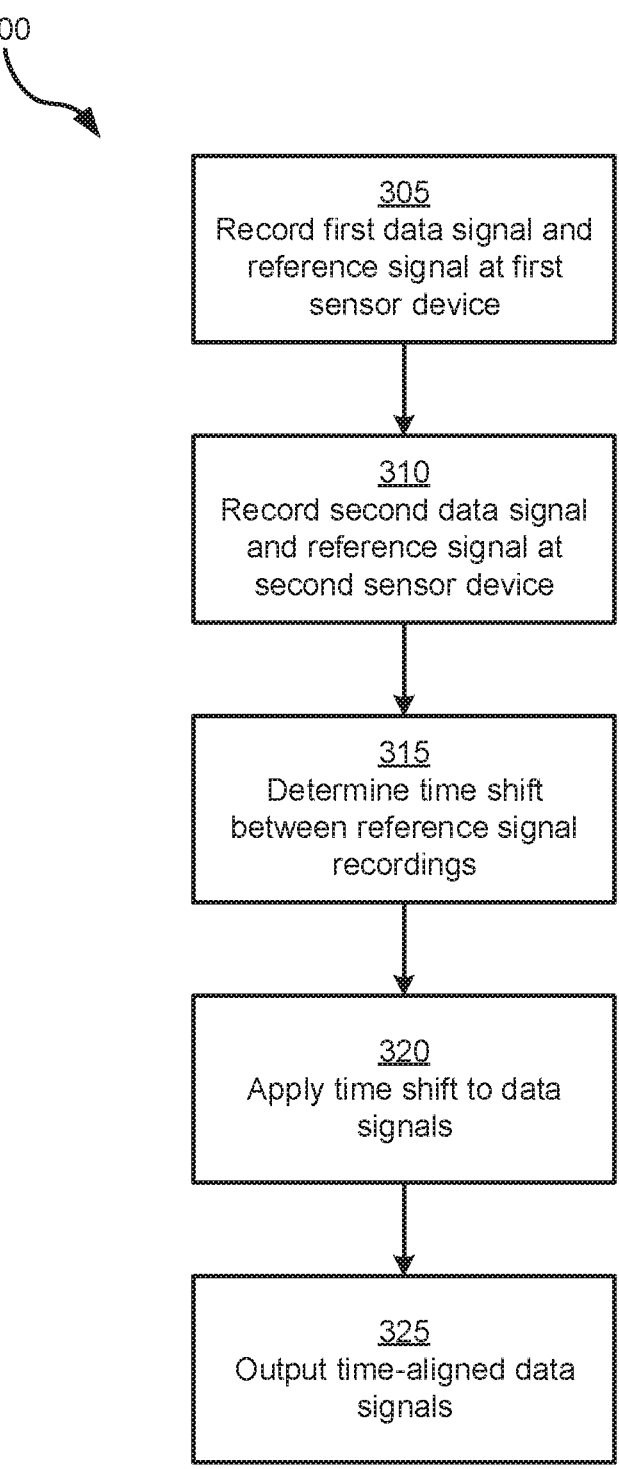
FIG. 3 depicts a flowchart of an example method of signal synchronization in the system of FIG. 1.

The operation of the system 100 will now be described in greater detail, with reference to FIG. 3. FIG. 3 depicts a flowchart of an example method 300 of signal synchronization using a reference signal, which will be described in conjunction with its performance in the system 100, with reference to the components illustrated in FIGS. 1 and 2. In particular, the method 300 may be implemented via execution of the applications 220 and 262 by the processors 200 and 250, respectively. In other examples, the method 300 may be performed by other suitable computing devices or in other suitable systems.

Figure 4:
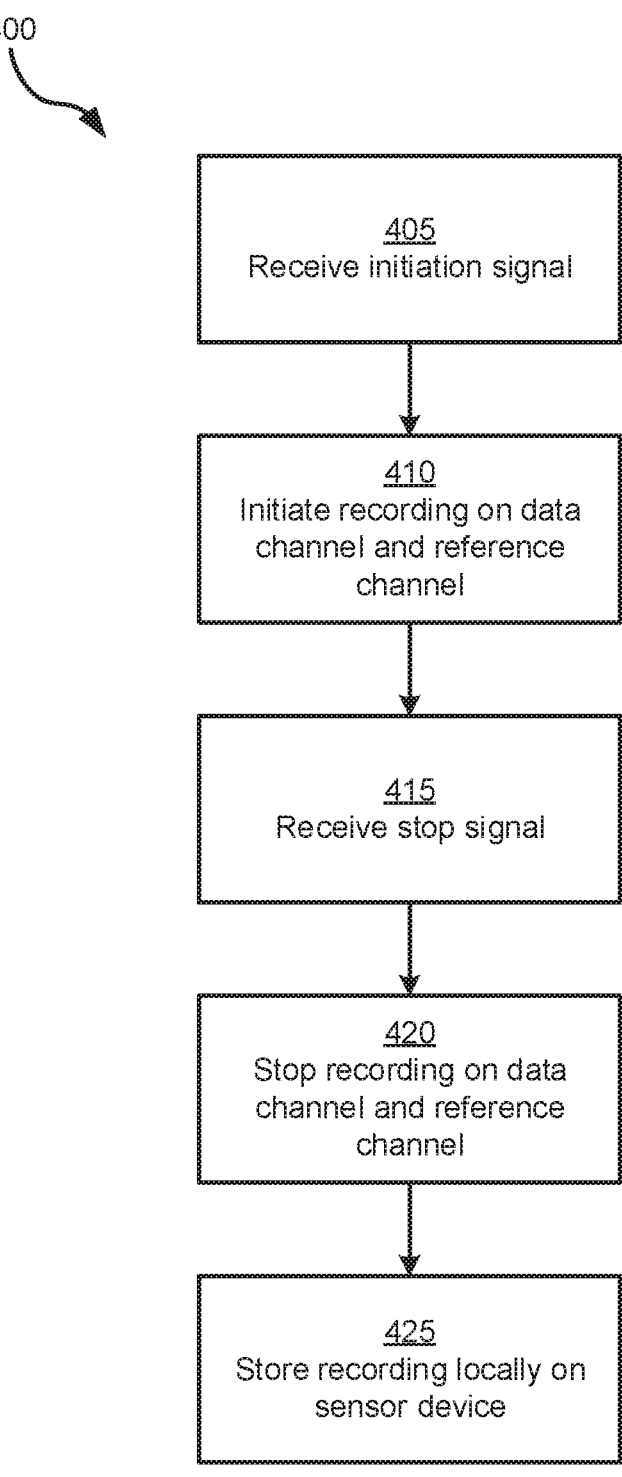
FIG. 4 depicts a flowchart of an example method of generating a sensor recording at a sensor device for use in the signal synchronization method of FIG. 4.

At block 305, the first sensor device 102-1 records a first informational signal as detected at the first sensor device 102-1 and the reference signal as detected at the first sensor device 102-1. The first sensor device 102-1 may initiate the recording in response to an initiation signal, received for example from the control device 104. For example, referring to FIG. 4, an example method 400 of performing a recording operation at a sensor device 102 is depicted. The method 400 will be described in conjunction with its performance by the first sensor device 102-1; in other examples, the method 400 may be performed by other suitable devices, such as the second sensor device 102-2.

At block 405, the sensor device 102-1 receives an initiation signal. For example, the initiation signal may be sent from the control device 104. The initiation signal may be received, for example via a mobile network, an internet connection, or the like. In other examples, the initiation signal may be an input from an operator of the sensor device 102-1. For example, the operator may be utilizing another computing device (e.g., a mobile phone) to receive start instructions from an operator of the control device 104 (or otherwise central controller) or an operator of the second sensor device 102-2, and the operator may manually provide the input to the sensor device 102-1 to act as an initiation signal to initiate the recording operation at the sensor device 102-1. It is not necessary for the initiation signal to be received at the first and second sensor devices 102 at precisely the same time.

At block 410, in response to the initiation signal, the sensor device 102-1 initiates the recording operation. In particular, the sensor device 102-1 may initialize the informational signal sensor 208 and the reference signal sensor 212 to enable them to detect informational signals emitted from the informational signal source 108 and reference signals emitted from the reference signal source 110, respectively. The sensor device 102-1 further initiates a first sensor recording to record the signals detected by the informational signal sensor 208 and the reference signal sensor 212.

In particular, the first sensor device 102-1 detects an informational signal emitted from the informational signal source 108 via the informational signal sensor 208. In response to detecting the informational signal, the first sensor device 102-1 generates first informational data representing the informational signal as detected at the first sensor device 102-1. That is, the first informational signal corresponds to the first informational data representing the informational signal as detected at the first sensor device 102-1. The first sensor device 102-1 may record the first informational data in a first informational track of the first sensor recording. Thus, the first informational track represents the first informational signal as detected at the first sensor device 102-1.

The first sensor device 102-1 further detects a reference signal emitted from the reference signal source 110 via the reference signal sensor 212. In response to detecting the reference signal, the first sensor device 102-1 generates first reference data representing the reference signal as detected at the first sensor device 102-1. The first sensor device 102-1 may record the first reference data in a first reference track of the first sensor recording. Thus, the first reference track represents the reference signal as detected at the first sensor device 102-1.

The informational and reference tracks of the sensor recording are correlated to each other to be time-aligned relative to one another. For example, they may begin at the same time. In other examples, they may be recorded relative to an internal clock of the sensor device 102-1.

At block 415, the sensor device 102-1 receives a stop or termination signal. For example, the stop signal may be sent from the control device 104. The stop signal may be received, for example via a mobile network, an internet connection, or the like. In other examples, the stop signal may also be a manual input from an operator of the sensor device 102-1.

At block 420, in response to the stop or termination signal, the sensor device 102-1 stops the recording operation. In particular, the sensor device 102-1 may deactivate the informational signal sensor 208 and the reference signal sensor 212. In other examples, the sensor device 102-1 may leave the informational signal sensor 208 and the reference signal sensor 212 active but may stop recording the informational signal and the reference signal detected at the informational signal sensor 208 and the reference signal sensor 212 active respectively. That is, the sensor device 102-1 ends the recording of the first informational data and the first reference data on the first informational and first reference tracks of the first sensor recording, respectively.

At block 425, the sensor device 102-1 stores the first sensor recording locally on the sensor device 102-1. For example, the sensor device 102-1 may store the first sensor recording in the repository 224. The first sensor recording may be stored in association with identification data or other parameters of the recording, such as a time of the recording (e.g., a start time, end time, duration, as determined based on an on-board clock), an identifier of the recording and/or the sensor device 102-1, or other suitable and pertinent data.

Returning to FIG. 3, at block 310, the second sensor device 102-2 records a second informational signal as detected at the second sensor device 102-2 and the reference signal as detected at the second sensor device 102-1. The second sensor device 102-2 may similarly initiate the recording in response to an initiation signal, received for example from the control device 104. For example, the second sensor device 102-2 may execute the method 400 to generate a second sensor recording. In particular, the second sensor device 102-2 detects an informational signal emitted from the informational signal source 108. The informational signal may the same one as the one detected at the first sensor device 102-1 or it may be a different informational signal. In response to detecting the informational signal, the second sensor device 102-2 generates second informational data representing the informational signal as detected at the second sensor device 102-2. That is, the second informational signal corresponds to the second informational data representing the informational signal as detected at the second sensor device 102-2. The second sensor device 102-2 may record the second informational data in a second informational track of the second sensor recording.

The second sensor device 102-2 further detects the reference signal emitted from the reference signal source 110. In response to detecting the reference signal, the second sensor device 102-2 generates second reference data representing the reference signal as detected at the second sensor device 102-2. The second sensor device 102-2 may record the second reference data in the second reference track of the second sensor recording. Thus, the second reference track represents the reference signal as detected at the second sensor device 102-2.

The tracks of the sensor recording are similarly correlated to each other to be time-aligned relative to one another.

The sensor devices 102 are not limited to detecting a single reference signal. In some examples, the sensor device 102 has more than one channel for detecting more than one reference signal. Sensor devices 102 may detect multiple reference signals simultaneously or sequentially.

At block 315, the control device 104 obtains the first sensor recording generated at block 305 and the second sensor recording generated at block 310 for analysis. In particular, after obtaining the sensor recordings, the control device 104 determines a time shift between the first reference track and the second reference track. That is, the control device 104 determines a time shift between the reference signal as recorded by the first sensor device 102-1 and the reference signal as recorded by the second sensor device 102-2.

For example, the control device 104 may determine the time shift by cross-correlating the reference signal as recorded by the first sensor device 102-1 and the reference signal as recorded by the second sensor device 102-2, determining a peak of the cross-correlation and defining a time associated with the peak as the time shift.

Figure 5A:
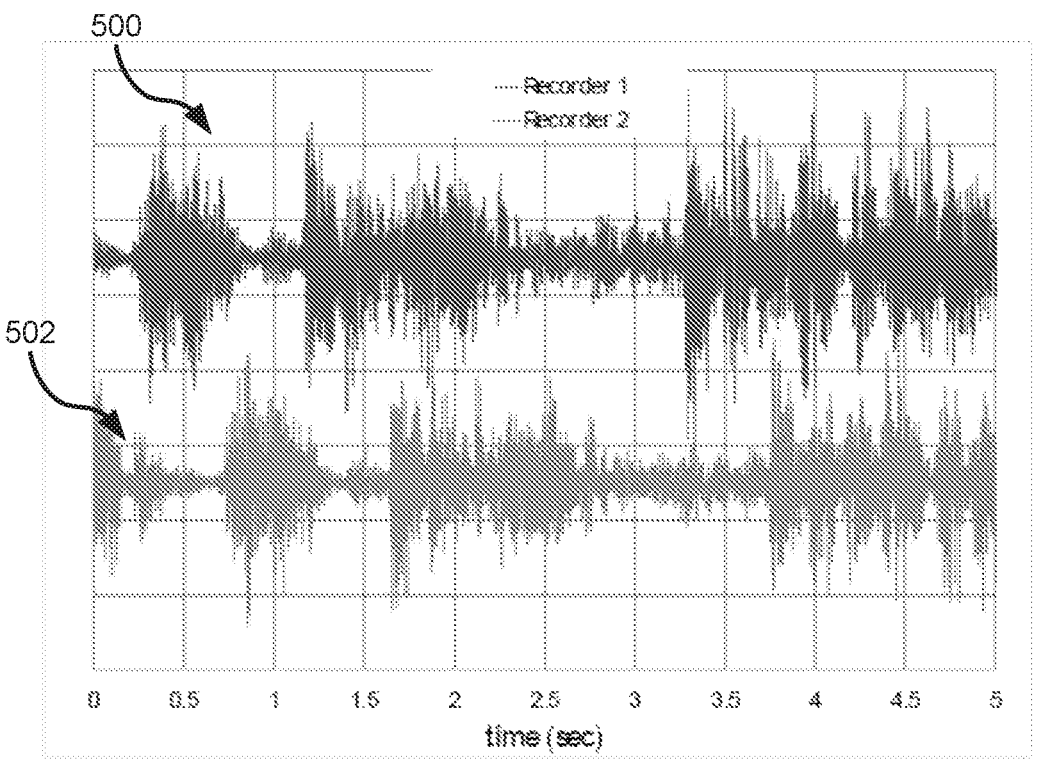
FIG. 5A depicts a schematic of reference signal recordings.
Figure 5B:
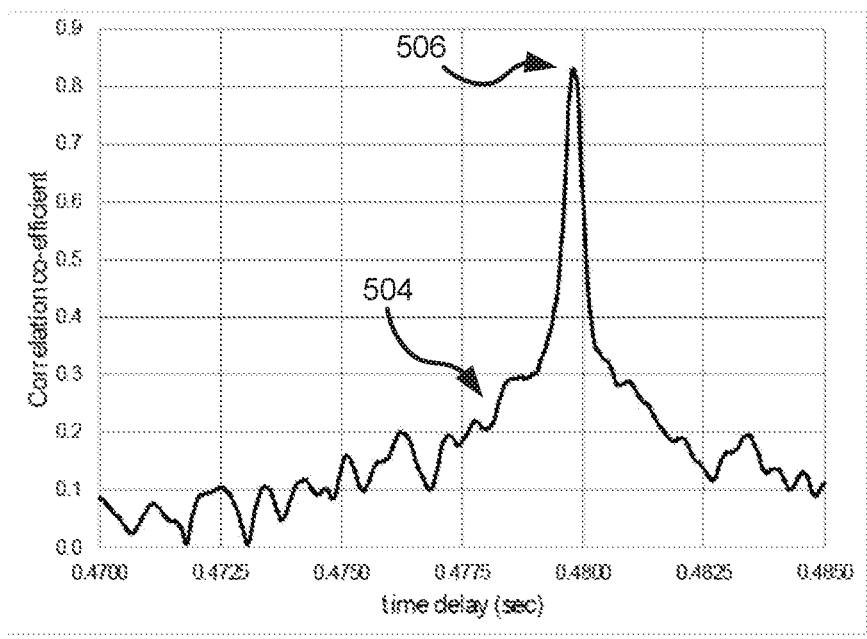
FIG. 5B depicts a schematic of a cross-correlation between the reference signal recordings of FIG. 5A.

For example, referring to FIG. 5A, example reference track recordings 500 and 502 recorded by two separate sensor devices are depicted. FIG. 5B depicts a cross-correlation 504 of the reference track recordings 500 and 504. As can be seen, the cross-correlation 504 has a peak 506 at about 0.4798 seconds. Thus, at block 315 of the method 300, the control device 104 may determine the time shift to be about 0.4798 seconds.

Returning to FIG. 3, at block 320, the control device 104 applies the time shift determined at block 315 to the informational signals time-align the informational signals. Specifically, the control device 104 may apply the determined time shift to the second informational signal to time-align the first informational signal and the second informational signal. That is, the control device 104 may shift the informational signals relative to each other, by the determined time shift such that the cross-correlation of the informational signals has a global maximum (i.e., a peak) at zero-time delay.

In some examples, after applying the time shift to the second informational signal, the control device 104 may conduct a quality check of the first and second informational signals. The quality check may include computing coherence, computing the signal-to-noise ratio, identifying contamination to the signal, combinations thereof, and the like. For example, the signal may be contaminated by electromagnetic interference which can be detected near an electrical station. The quality check may identify contamination caused by said electrical station.

When computing coherence, the control device 104 may apply a further cross-correlation function to verify that the peak is at approximately zero-time delay. Specifically, the control device 104 may compute the coherence of the first and second informational signals to verify that the informational signals are synchronized. In one example, the pre-determined threshold for coherence is an error of about ±0.5/$f_s$, where $f_s$ is the sampling frequency of sensor devices 102.

If the coherence is below a pre-determined threshold, the control device 104 may control the system 100 to repeat steps 305 to 320. Similarly, if the signal-to-noise ratio fails to meet a pre-determined threshold or contamination exceeds a pre-determined threshold, the control device 104 may control the system 100 to repeat the step 305 to 320. The quality check may be performed by the control device 104 at the site of the synchronization, which can provide confirmation of the quality of the data shortly after the signals are recorded. This allows the control device 104 to identify a problem with the data and repeat the steps 305 to 320 before the system 100 is disassembled or users return to a base station.

In implementations where the sensor devices 102 record two or more reference signals, the control device 104 may perform a quality check to compare the two or more reference signals. As part of the quality check, the control device 104 may select the optimal reference signal from the two or more reference signals. The optimal reference signal may be selected as the reference signal with the highest coherence, the lowest signal-to-noise ratio, the least signal contamination, or a combination thereof.

At block 325, the control device 104 outputs the time-aligned informational signals for further processing. In some examples, the control device 104 may perform the additional processing, while in other examples, the control device 104 may communicate the time-aligned informational signals to a separate computing device (e.g., a server, a desktop or laptop computer) or to a storage medium such as a universal serial bus (USB) stick for transfer to another computing device, or the like. In still further examples, the control device 104 may simply store the time-aligned informational signals in the repository 266. For example, the time-aligned informational signals may be used to determine properties of a target object based on the difference in propagation of the informational signal over time to the first sensor device 102-1 at a first location and to the second sensor device 102-2 at a second location.

Figure 6:
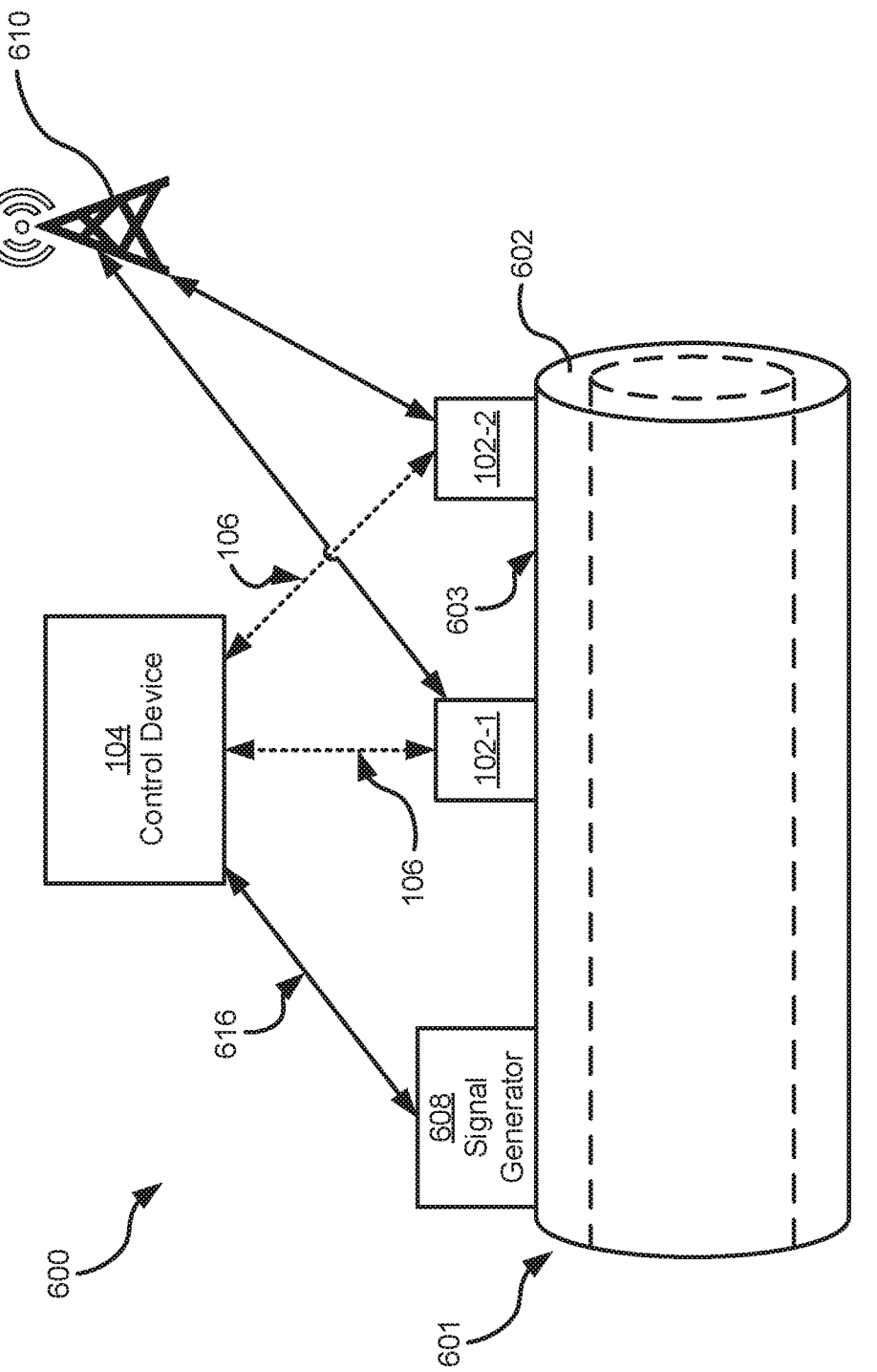
FIG. 6 depicts an example system for non-invasive determination of properties of a pressure vessel employing the signal synchronization system of FIG. 1.

For example, referring to FIG. 6, an example application of the above-described signal synchronization system 100 to an example system 600 for non-invasive determination of target properties of a pressure vessel is depicted. The system 600 includes the control device 104, a signal generator 608, and the sensor devices 102-1 and 102-2.

The system 600 is deployed to determine properties of a pressure vessel 601. For example, the pressure vessel 601 may be a pipe defined by a wall 602 enclosing a fluid. The system 600 may determine properties of the wall 602, such as a thickness of the wall 602 at various points along the wall, locations of any cracks or faults of the wall 602, and the like. More particularly, the system 600 is configured to determine the properties of the pressure vessel 601 using non-invasive methods. Accordingly, the signal generator 608 and the sensors 102 are deployed at an external surface 603 of the wall 602. The system 600 may thus be employed on in-use pressure vessels without destroying or otherwise affecting the integrity of the pressure vessel.

The signal generator 608 acts as the informational signal source 108 of the system 100. In particular, the signal generator 608 is physically, thermally, vibrationally, electrically or acoustically coupled to a fluid contained within the pressure vessel 601. The signal generator 608 is disposed externally to the pressure vessel 601, such as at the external surface 603, at fittings, flanges, valves, or the like. The signal generator 608 is configured to emit signals into the pressure vessel 601, and more particularly into the fluid contained in the pressure vessel 601. Subsequent examples describe the signal generator 608 as emitting an acoustic signal, however it should be understood that the signal generator 608 is not particularly limited. Signals emitted by the signal generator 608 may include electrical signals, acoustic signals, vibratory signals, pressure signals, combinations thereof and the like. The signal generator 608 may be in communication with the control device 104 via communication link 616, over which the signal generator 608 may receive instructions from the control device 104.

The sensors 102 are also physically, thermally, vibrationally, electrically or acoustically coupled to the fluid and disposed externally to the pressure vessel 601 to detect signals. In particular, the sensors 102 may employ accelerometers, temperature sensors, pressure sensors, displacement sensors, electrical sensors, combinations of the above, and the like to detect signals emitted by the signal generator 608, as transmitted or reflected through the pressure vessel 601. In some examples, the signal generator 608 emits an acoustic signal which is detected by the sensor with at least one of: a pressure sensor and a temperature sensor. The sensors 102 may further employ accelerometers, temperature sensors, pressure sensors, displacement sensors, electrical sensors, combinations of the above, and the like to detect background conditions or characteristics of the system 100. Sensor data pertaining to background conditions or characteristics of the system 100 may aid or enhance the interpretation of informational signals emitted by the signal generator 608.

The sensors 102 are further in communication with a radio tower 610 to detect FM radio waves as the reference signal. That is, the radio tower 610 acts as the reference signal source 110 of the system 100.

In operation, prior to initiating recordings, an operator may tune the radio receiver of the sensor devices 102 to the same radio station (e.g., a pre-selected radio station). When the sensor devices 102 are tuned, the control device 104 may issue an initiation signal to the signal generator 608 and the sensor devices 102. In response to an initiation signal, the signal generator 608 emits acoustic signals into the pressure vessel 601. In particular, the control device 104 may select a particular frequency and duration at which the signal generator 608 is to emit the acoustic signals to optimize the signals received at the sensor devices 102 and to optimize the determination of the target properties of the pressure vessel 601. The frequency and duration of the acoustic signals may be selected according to a predefined program stored in memory at the control device 104 or may be dynamically selected based on the calibration results and previously emitted and detected acoustic signals. For example, the frequency and duration may be selected based on one or more of: the material of the pressure vessel 601, the diameter of the pressure vessel 601, the type of fluid contained in structures of the pressure vessel 601. For example, the control device 104 may control the frequency, duration, and power of the emitted acoustic signals to optimize the signals received at the sensor devices 102. The acoustic signals may be emitted at frequencies in the range of 1 to 20,000 Hz. In some examples, the acoustic signals may be emitted at higher frequencies. Additionally in response to the initiation signal, the sensor devices 102 initiate recording operations, to generate sensor recordings, each having an informational track storing the acoustic signals as detected at the respective sensor device 102, and a reference track storing the FM radio signal as detected at the respective sensor device 102.

The control device 104 may optionally issue a stop or termination signal to cause the signal generator 608 to stop issuing acoustic signals, and to stop the sensor recordings at the sensor devices 102.

Subsequently, the control device 104 (or another computing device, as appropriate), may obtain the sensor recordings from the sensor devices 102. In order to determine properties of the pressure vessel 601, the acoustic signals as received at the sensor devices 102 are cross-correlated and compared; the differences in travel time and signal strength between the signals as received at each of the sensor devices 102 provides insight as to the properties of the pressure vessel 601. However, in order to determine accurate differences in travel time, the acoustic signals as received at each of the sensor devices 102 should be time-aligned.

Accordingly, the control device 104 may proceed to determine the time shift between the reference signal tracks and apply the time shift to the informational (acoustic) signals to time-align the detected acoustic signals. The time-aligned detected acoustic signals may then be cross-correlated and compared to accurately determine properties of the pressure vessel 601. For example, the properties may be determined by methods described in U.S. Provisional Application No. 63/023,017, the contents of which are incorporated by reference. That is, the properties of the pressure vessel 601 may be determined based on the first informational signal and the second informational signal, as time-aligned by the control device 104.

As described above, a system for signal synchronization is provided. The system includes sensor devices which are capable of recording an informational signal (i.e., a signal of interest) on a first track and a reference signal (i.e., which is consistently and universally broadcasted to all sensor devices) on a second track. A control device may subsequently use the reference signals to determine a time shift between the recordings, and apply the time shift to the informational signals to time-align the informational signals. Advantageously, the time-alignment or synchronization of the signals may be performed after the recording operation, rather than requiring synchronization before and during the recording operation. Further, since the sensor recordings are stored locally, the present system provides greater flexibility in the physical range (i.e., distance) and number of sensor devices for which signal synchronization is to be performed.

The scope of the claims should not be limited by the embodiments set forth in the above examples but should be given the broadest interpretation consistent with the description as a whole.

The invention claimed is:

1. A method comprising:
recording, at a first sensor device, (i) a first informational signal as detected at the first sensor device; and (ii) a reference signal as detected at the first sensor device;
recording, at a second sensor device (i) a second informational signal as detected at the second sensor device; and (ii) the reference signal as detected at the second sensor device;
determining a time shift between the reference signal as recorded by the first sensor device and the reference signal as recorded by the second sensor device; and
applying the determined time shift to the second informational signal to time-align the first informational signal and the second informational signal.

2. The method of claim 1, wherein the reference signal comprises a frequency modulated (FM) radio signal.

3. The method of claim 1, wherein the reference signal comprises an optical signal.

4. The method of claim 1, wherein determining the time shift comprises:
cross-correlating the reference signal as recorded by the first sensor device and the reference signal as recorded by the second sensor device;
determining a peak of the cross-correlation; and
defining a time associated with the peak as the time shift.

5. The method of claim 1, further comprising:
emitting an acoustic signal from a signal generator into a pressure vessel; and
wherein the first informational signal represents the acoustic signal as detected by the first sensor device; and the second informational signal represents the acoustic signal as detected by the second sensor device.

6. The method of claim 5, further comprising computing, based on the first informational signal and the second informational signal, properties of the pressure vessel.

7. The method of claim 1, further comprising initiating the recording at the first sensor device and the recording at the second sensor device in response to receiving an initiation signal.

8. The method of claim 1, further comprising:
recording another reference signal at the first and second sensor devices; and
selecting one of the reference signal and the another reference signal.

9. A computing device comprising:
a memory;
a communications interface configured to communicate with a first sensor device and a second sensor device;
a processor interconnected with the memory and the communications interface, the processor configured to:
obtain, from the first sensor device, a first sensor recording, the first sensor recording including (i) a first data track representing a first informational signal as detected by the first sensor device and (ii) a first reference track representing a reference signal as detected by the first sensor device;
obtain, from the second sensor device, a second sensor recording, the second sensor recording including (i) a second data track representing a second informational signal as detected by the second sensor device and (ii) a second reference track representing the reference signal as detected by the second sensor device;
determine a time shift between the reference signal as recorded by the first sensor and the reference signal as recorded by the second sensor; and
apply the determined time shift to the second informational signal to time-align the first informational signal and the second informational signal.

10. The computing device of claim 9, wherein to determine the time shift, the processor is configured to:
cross-correlate the reference signal as recorded by the first sensor device and the reference signal as recorded by the second sensor device;
determine a peak of the cross-correlation; and
define a time associated with the peak as the time shift.

11. The computing device of claim 9, wherein the processor is further configured to send an initiation signal to the first sensor device and the second sensor device to initiate the first sensor recording and the second sensor recording, respectively.

12. The computing device of claim 9, wherein the processor is further configured to output the time-aligned first informational signal and second informational signal.

13. The computing device of claim 9, wherein the processor is further configured to record another reference signal at the first and second sensor devices and select one of the reference signal and the another reference signal.

14. A sensor device comprising:

an informational signal sensor configured to detect an informational signal;

a reference signal sensor comprising (i) a frequency modulated (FM) radio receiver configured to detect an FM radio signal as a reference signal or (ii) an optical sensor configured to detect an optical signal as the reference signal;

a memory; and a processor interconnected with the informational signal sensor, the reference signal sensor and the memory, the processor configured to:

generate informational data representing the informational signal and record the informational data in an informational track of a sensor recording;

generate reference data representing the reference signal and record the reference data in a reference track of the sensor recording, wherein the informational track and the reference track are time-aligned relative to one another; and store the sensor recording locally in the memory.

15. The sensor device of claim 14, wherein the informational signal sensor comprises an acoustic sensor configured to detect an acoustic signal as the informational signal.

16. The sensor device of claim 14, wherein the processor is configured to initiate the sensor recording in response to an initiation signal.

17. The sensor device of claim 14, wherein the processor is configured to terminate the sensor recording in response to a termination signal.

18. The sensor device of claim 14, wherein the reference signal sensor is further configured to detect another reference signal and the processor is further configured to select one of the reference signal and the another reference signal.

\* \* \* \* \*